United States Patent [19]

Maruyama et al.

[11] Patent Number: 4,663,987
[45] Date of Patent: May 12, 1987

[54] SPEED-CHANGE/STEERING SYSTEM FOR CRAWLER TYPE VEHICLES

[75] Inventors: Ryoichi Maruyama, Yokohama; Teruyoshi Kikuchi, Chigasaki, both of Japan

[73] Assignee: Kabushiki Kaisha Komatsu Seisakusho, Tokyo, Japan

[21] Appl. No.: 669,988

[22] Filed: Nov. 9, 1984

[51] Int. Cl.$^4$ .................. F16H 47/04; F16H 37/06
[52] U.S. Cl. ................................ 74/687; 74/720.5
[58] Field of Search .............. 74/720.5, 687, 681, 74/682, 688; 186/6.44

[56] References Cited

U.S. PATENT DOCUMENTS

| | | | |
|---|---|---|---|
| 3,199,376 | 8/1965 | DeLalio | 74/720.5 |
| 3,532,006 | 10/1970 | Polak et al. | 74/720.5 |
| 3,590,658 | 7/1971 | Tuck | 74/687 |
| 3,596,535 | 8/1971 | Polak | 74/687 |
| 4,232,568 | 11/1980 | Maeda | 74/687 |
| 4,497,218 | 2/1985 | Zaunberger | 74/720.5 |

FOREIGN PATENT DOCUMENTS 55-91418  11/1980  Japan .

*Primary Examiner*—Leslie Braun
*Assistant Examiner*—Martin G. Belisario
*Attorney, Agent, or Firm*—Armstrong, Nikaido, Marmelstein & Kubovcik

[57] ABSTRACT

A novel speed-change/steering system for crawler type vehicles comprises first and second stepless speed changers and a plurality of planetary gear assemblies disposed along one axis. First and second output shafts of the system are connected to respective elements of any two of the planetary gear assemblies. The input shafts of the first and second stepless speed changers are coupled to a power source, and the output shafts of the first and second stepless speed changers are connected to the planetary gear assemblies. One of the planetary gear assemblies is coupled to the power source. There is provided at least one clutch for fixing at least one element in the planetary gear assemblies. Also there are provided means for connecting elements of adjacent planetary gear assemblies.

2 Claims, 6 Drawing Figures

SPEED-CHANGE/STEERING SYSTEM FOR CRAWLER TYPE VEHICLES

BACKGROUND OF THE INVENTION

This invention relates to a speed-change and steering system for crawler type vehicles.

Heretofore, a power transmission system for changing a speed of a crawler type vehicle or steering it has been known. In one of such known speed-change/steering systems for crawler type vehicles, as shown in FIG. 1, a first shaft a coupled to an engine E is connected to first and second pumps $c_1$ and $c_2$ via gear means b, first and second motors $d_1$ and $d_2$ driven by the pumps $c_1$ and $c_2$, respectively, are connected via gear means f to a plurality of planetary gear means e mounted on the first shaft a and planetary gear means n and p mounted on a third shaft m, the first shaft a is connected to the planetary gear means e or a second shaft l by switching ON or OFF a plurality of clutches k mounted on the first shaft a, the planetary gear means e is connected to the second shaft l via gear means q, the second shaft l is connected to the planetary gear means n via gear means g, a first output shaft h is connected to the planetary gear means n, the second shaft l is connected via gear means i to the planetary gear means p, a second output shaft j is connected to the planetary gear means p, the clutches k are switched ON or OFF, and delivery volumes of the pumps $c_1$ and $c_2$ are changed, this a crawler type vehicle is changed in speed or steered in either direction (For example, refer to Japanese Patent Application Laid-open Specification No. 55-091418).

With the above-described power transmission systems, althrough it is possible to smoothly change the speed of or to steer a crawler type vehicle, on the other hand, since the first shaft a, second and third shafts l and m and the first and second pumps and motors $c_1$, $d_1$, $c_2$ and $d_2$ are disposed in juxtaposition, the overall system becomes very large-sized, and further since a large power is transmitted also to the second and third shafts l and m, the second and third shafts must be supported so as to bear against the heavy load, and therefore, this system has a disadvantage that the number of component parts becomes large and the weight of the system becomes heavy.

SUMMARY OF THE INVENTION

It is therefore one object of the present invention to provide a speed-change/steering system for crawler type vehicles, which can smoothly change speed and steer, and which can be made compact as a whole and light in weight.

According to one feature of the present invention, there is provided a speed-change/steering system for crawler type vehicles comprising first and second stepless speed changers each of which can change its input-to output rotational speed ratio in a stepless manner, a plurality of planetary gear assemblies disposed along one axis, first and second output shafts connected to elements of respective ones of any two of the planetary gear assemblies, means for coupling a power source to input shafts of the first and second stepless speed changers, means for connecting output shafts of the first and second stepless speed changers to the planetary gear assemblies, means for coupling one of the planetary gear assemblies to the power source, clutches for fixing elements of the planetary gear assemblies, and means for connecting elements of adjacent planetary gear assemblies.

The above-mentioned and other features and objects of the present invention will become more apparent by reference to the following description of preferred embodiments of the invention taken in conjunction with the accompanying drawings.

DESCRIPTION OF THE PREFERRED EMBODIMENTS

Now, a first preferred embodiment of the present invention will be described with reference to FIG. 2.

Figure 1:
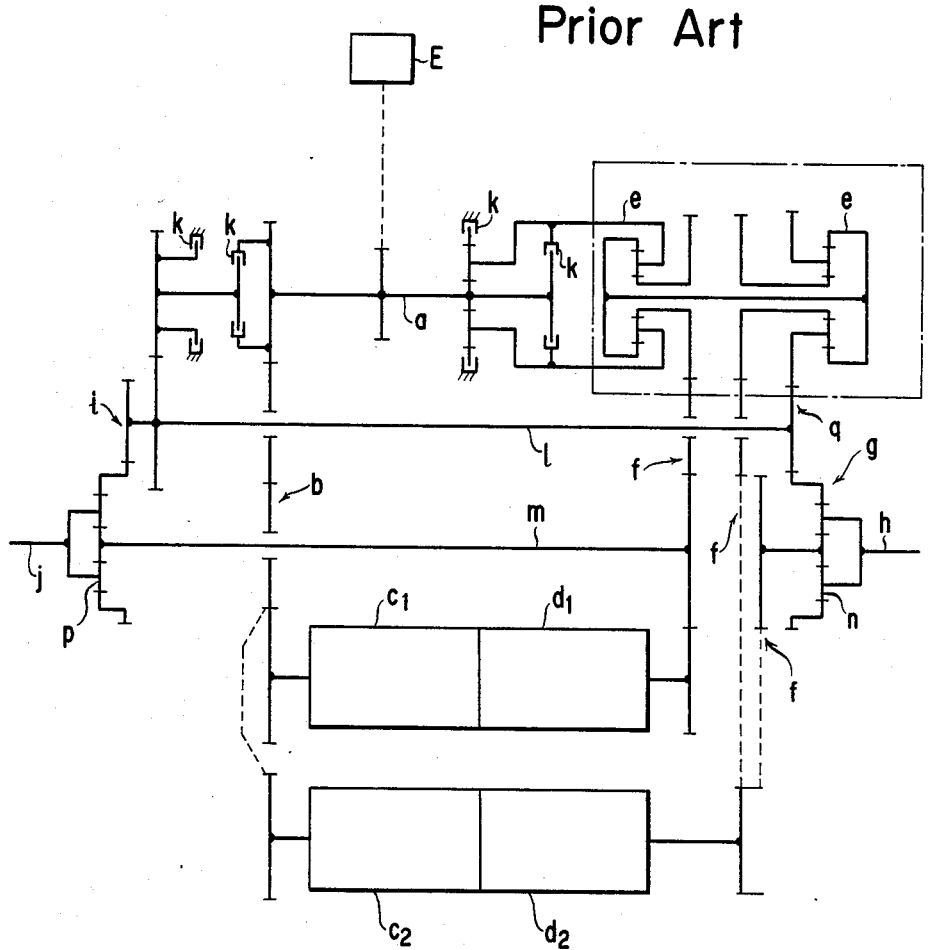
FIG. 1 is a schematic system diagram showing one example of a speed-change/steering system for crawler type vehicles in the prior art.
Figure 2:
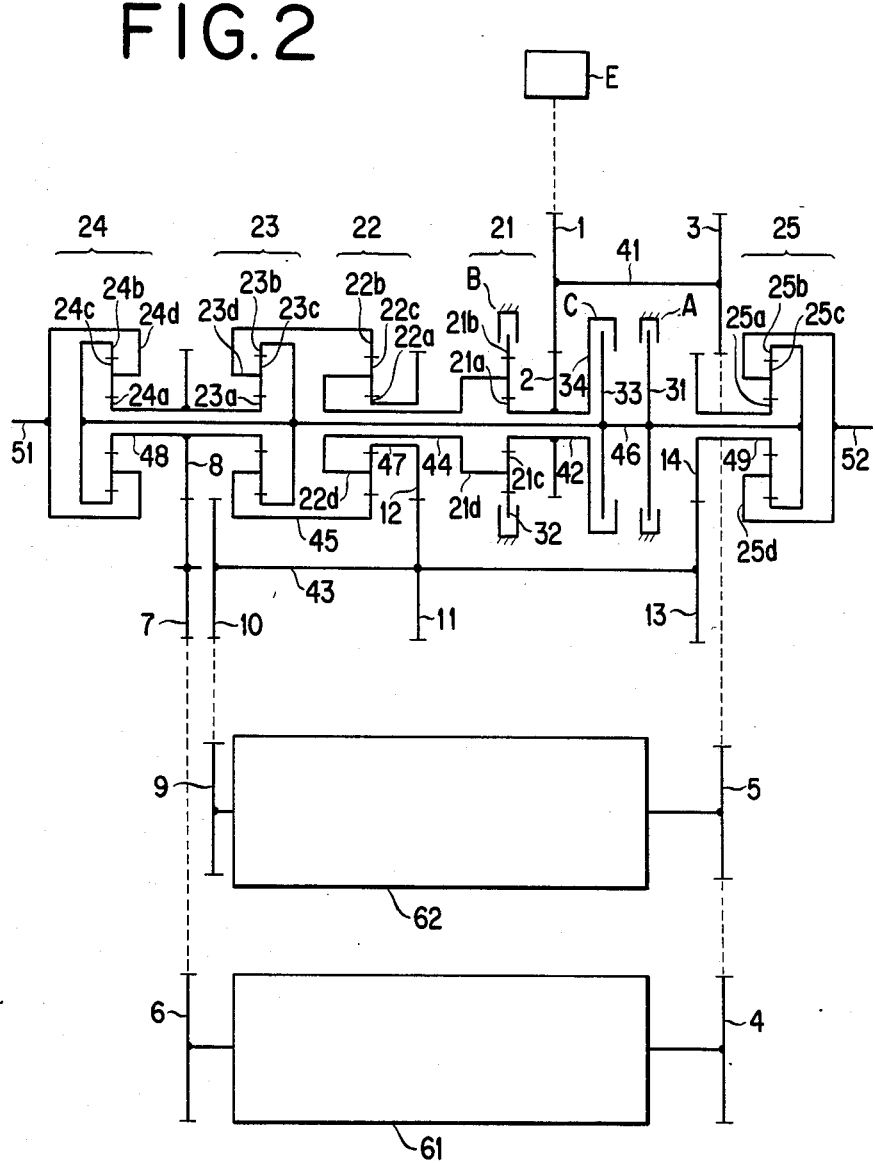
FIG. 2 is a schematic system diagram showing a first preferred embodiment of the present invention.

In FIG. 2, an input gear 1 coupled to an engine E serving as a power source, is mounted on an input shaft 41, on this input shaft 41 is also mounted a first gear 3, and the input gear 1 meshes with a second gear 2.

A sun gear 21a of a first planetary gear assembly 21 and a clutch housing 34 are mounted on a shaft 42, the sun gear 21a meshes with planetary gears 21c, the planetary gears 21c mesh with a ring gear 21b, the ring gear 21b is mounted on a disc 32, and the disc 32 can be fixed by a second brake B.

The above-described planetary gears 21c are rotatably mounted on a carrier 21d, and the carrier 21d is mounted on a shaft 44.

On the shaft 44 is also mounted a carrier 22d of a second planetary gear assembly 22, planetary gears 22c are rotatably mounted on the carrier 22d, the planetary gears 22c mesh with a sun gear 22a and a ring gear 22b, the sun gear 22a is fixedly secured to a shaft 47, on the shaft 47 is mounted a 13th gear 12, the ring gear 22b is mounted on a drum 45, and on the drum 45 is also mounted a carrier 23d of a third planetary gear assembly 23.

On this carrier 23d are rotatably mounted planetary gears 23c, which mesh with a sun gear 23a and a ring gear 23b, and the ring gear 23b is mounted on a main shaft 46.

The above-described sun gear 23a is mounted on a shaft 48, on the shaft 48 are also mounted a third gear 8 and a sun gear 24a of a fourth planetary gear assembly 24, the sun gear 24a meshes with planetary gears 24c which in turn mesh with a ring gear 24b, the planetary gears 24c are rotatably mounted on a carrier 24d, and the carrier 24d is mounted on a first output shaft 51.

On the above-described main shaft 46 are mounted the above-mentioned ring gear 23b, the ring gear 24b, a ring gear 25b of a fifth planetary gear assembly 25, a disc 31 and a disc 33.

The above-described ring gear 25b meshes with planetary gears 25c, which are rotatably mounted on a carrier 25d and mesh with a sun gear 25a, the carrier 25d is mounted on a second output shaft 52, and the above-mentioned sun gear 25a is fixedly secured to a shaft 49, on which is also mounted a fourth gear 14.

The above-mentioned disc 31 is capable of being fixed by a first brake A, while the disc 33 can be fixed to the above-described clutch housing 34 by a third clutch C.

The above-described first gear 3 meshes with a fifth gear 4 and a sixth gear 5, the fifth gear 4 is mounted on an input shaft of a first stepless speed changer 61, the sixth gear 5 is mounted on an input shaft of a second stepless speed changer 62, and on an output shaft of the first stepless speed changer 61 is mounted a seventh gear 6, which meshes, via an eighth gear 7, with the above-described third gear 8.

On an output shaft of the second stepless speed changer 62 is mounted a ninth gear 9, which meshes with a tenth gear 10 that is mounted on a shaft 43, on the shaft 43 are mounted an 11th gear 11 and a 12th gear 13, the 11th gear meshes with the above-described 13th gear 12, and the 12th gear 13 meshes with the above-described fourth gear 14.

Here, it is to be noted that each of the above-described first and second stepless speed changers 61 and 62 can change its input-to-output rotational speed ratio [(a rotational speed of the seventh gear 6 or the ninth gear 9)÷(a rotational speed of the fifth gear 4 or the sixth gear 5)] in a stepless manner from a negative value to a positive value. For instance, a stepless speed changer consisting of a combination of a variable swash plate type axial piston pump (hereinafter called simply "oil hydraulic pump") and a fixed (or variable) swash plate type axial piston motor (hereinafter called simply "oil hydraulic motor"), or a combination of a generator and a motor, has been known.

Also it is to be noted that the respective shafts 49, 42, 44 and 48 are made in the form of hollow shafts, and the main shaft 46 penetrates through the respective hollow shafts 49, 42, 44 and 48.

Now description will be made of the operation of the above-described speed-change/steering system according to the first preferred embodiment as well as the details of the respective component parts.

(1) Speed step for a first speed:
The first clutch A is engaged, and the other second and third clutches B and C are disengaged.

Thereby, the power supplied to the input gear 1 is transmitted to the sun gear 24a and the sun gear 25a through the first, fifth and sixth gears 3, 4 and 5, the first and second stepless speed changers 61 and 62, and the seventh, eighth, third, ninth, tenth, 12th and fourth gears 6, 7, 8, 9, 10, 13 and 14.

On the other hand, since the ring gears 24b and 25b are fixed via the shaft 46 by the clutch A, power is transmitted from the carriers 24d and 25d to the first and second output shafts 51 and 52, respectively.

Under this condition, by increasing the input-to-output rotational speed ratios of the stepless speed changers 61 and 62 starting from 0, the rotational speeds of the first and second output shafts 51 and 52 can be increased from 0, and also by reversing the output rotation of the first and second stepless speed changers 61 and 62, the output shafts 51 and 52 can be rotated in the reverse direction.

Here it is to be noted that by appropriately selecting the numbers of teeth of the respective gears it is made possible to make the relative rotational speed of the second clutch B zero (that is, to make the disc 32 stationary) at particular values ($>0$) of the input-to-output rotational speed ratios of the stepless speed changers 61 and 62 during the speed step for a first speed. Hence, if the second clutch B is engaged and the first clutch A is disengaged at this moment, the operation can be shifted to the speed step for a second speed without any shock. And at this time, changes of rotational speeds of the respective component parts would not arise.

(2) Speed step for a second speed:
The second clutch B is engaged, and the first and third clutches A and C are disengaged.

At a time point when the input-to-output rotational speed ratios of the first and second stepless speed changers 61 and 62 take the above-mentioned particular values, the operation is switched to the speed step for a second speed, and subsequently, if the input-to-output rotational speed ratios of the first and second stepless speed changers 61 and 62 are decreased, then the rotational speeds of the first and second output shafts 51 and 52 would rise.

More particularly, a part of the power supplied to the input gear 1 is transmitted to the respective sun gears 22a, 23a, 24a and 25a by the intermediary of the first, fifth and sixth gears 3, 4 and 5, the first and second stepless speed changers 61 and 62, and the seventh, eighth, third, ninth, tenth, 11th, 13th, 12th and fourth gears 6, 7, 8, 9, 10, 11, 12, 13 and 14.

On the other hand, owing to the fact that the second clutch B is engaged, another part of the power supplied to the input gear 1 is transmitted to the carrier 22d by the intermediary of the second gear 2, the sun gear 21a, the planetary gears 21c, the carrier 21d and the shaft 44. This power transmitted to the carrier 22d is combined with the power transmitted to the sun gear 22a, and the resultant power is transmitted to the carrier 23d via the ring gear 22b and the drum 45. Here, the power transmitted to the carrier 23d is further combined with the power transmitted to the sun gear 23a and then transmitted via the ring gear 23b to the main shaft 46, and the transmitted power is divided to be transmitted from the main shaft 46 to the ring gear 24b and the ring gear 25b, respectively.

Then, the power transmitted to the ring gear 24b and the power transmitted to the sun gear 24a are combined and transmitted via the carrier 24d to the first output shaft 51, and likewise, the power transmitted to the ring gear 25b and the power transmitted to the sun gear 25a are combined and transmitted via the carrier 25d to the second output shaft 52.

If the input-to-output rotational speed ratios of the first and second stepless speed changers 61 and 62 are reduced, the shaft 46 is accelerated via the second and third planetary gear assemblies 22 and 23, and hence the rotational speeds of the ring gears 24b and 25b are increased. On the other hand, the sun gears 24a and 25a are decelerated. However, provided that the numbers of teeth of the respective gears are appropriately chosen, the rotational speeds of the first and second output shafts 51 and 52, which speeds are derived by combining the rotational speeds of the sun gear 24a and the ring gear 24b and by combining the rotational speeds of the sun gear 25a and the ring gear 25b, respectively, are increased.

As the input-to-output rotational speed ratios of the first and second stepless speed changers 61 and 62 are reduced, they pass through 0 and become negative rotational speed ratios, and when they have reached particular negative values, a relative rotational speed of the third clutch C becomes 0. Hence, if the third clutch C is engaged and the second clutch B is disengaged at this moment, then the operation can shift to the speed step for a third speed without any shock. At this time, no change occurs in the rotational speeds of the respective component parts.

(3) Speed step for a third speed:

The third clutch C is engaged, and the first and second clutches A and B are disengaged.

After the operation has been shifted to the speed step for a third speed at the particular values of the input-to-output rotational speed ratios of the first and second stepless speed changers 61 and 62, if the input-to-output rotational speed ratios of the stepless speed changers 61 and 62 are increased, the rotational speeds of the output shafts 51 and 52 would rise.

More particularly, a part of the power supplied to the input gear 1 is transmitted to the sun gears 24a and 25a by the intermediary of the first, fifth and sixth gears 3, 4 and 5, the first and second stepless speed changers 61 and 62, and the seventh, eighth, third, ninth, tenth, 12th and fourth gears 6, 7, 8, 9, 10, 13 and 14.

On the other hand, since the third clutch C is engaged, another part of the power supplied to the input gear 1 is transmitted to the main shaft 46 via the second gear 2, the third clutch C and the disc 33, and the transmitted power is further transmitted to the ring gears 24b and 25b as shared thereby.

Then, the power transmitted to the ring gear 24b and the power transmitted to the sun gear 24a are combined in the fourth planetary gear assembly 24, and the resultant power is transmitted, via the carrier 24d, to the first output shaft 51, a while the power transmitted to the ring gear 25b and the power transmitted to the sun gear 25a are combined in the fifth planetary gear assembly 25, and the resultant power is transmitted, via the carrier 25d to the second output shaft 52.

If the input-to-output rotational speed ratios of the first and second stepless speed changers 61 and 62 are increased, then the sun gears 24a and 25a are accelerated. On the other hand, the ring gears 24b and 25b are rotating at a constant speed, and so, the rotational speeds of the output shafts 51 and 52 would rise.

(4) Steering:

By providing a difference between the input-to-output ratios of the first and second stepless speed changers 61 and 62, a difference is produced between the rotational speeds of the first and second output shafts 51 and 52, so that the vehicle can turn.

More particularly, under any condition among the above-described speed steps for the first, second and third speeds, the ring gears 24b and 25b of the fourth and fifth planetary gear assemblies and kept at the same rotational speed by the intermediary of the shaft 46. Accordingly, the difference between the rotational speeds of the first and second output shafts 51 and 52 during running, is determined by the difference in rotational speeds between the sun gears 24a and 25a. Hence, by variably giving a difference between the input-to-output rotational speed ratios of the first and second stepless speed changers 61 and 62, the rotational speed difference between the first and second output shafts 51 and 52, that is, the radius of turning movement can be changed in a stepless manner.

Since the speed-change/steering system according to the first preferred embodiment is constructed and operates as described above, it can smoothly change in speed and steer a vehicle.

In addition, owing to the fact that the respective planetary gear assemblies 21, 22, 23, 24 and 25 and the respective clutches A, B and C are disposed serially on the main shaft 46, the respective component elements can be assembled along one axis, and hence the system can be constructed in a compact form, as a whole.

Furthermore, since a large power is transmitted to the main shaft 46 and then the large power is transmitted from the main shaft 46 to the first and second output shafts 51 and 52, the respective gears are not heavily loaded and can be rotatably supported by the respective planetary gear assemblies 21, 22, 23, 24 and 25 and the respective clutches A, B and C. Therefore, there is no need to specially provide parts for supporting shafts, hence the number of component parts is reduced and the system becomes light in weight and small in size.

Figure 3:
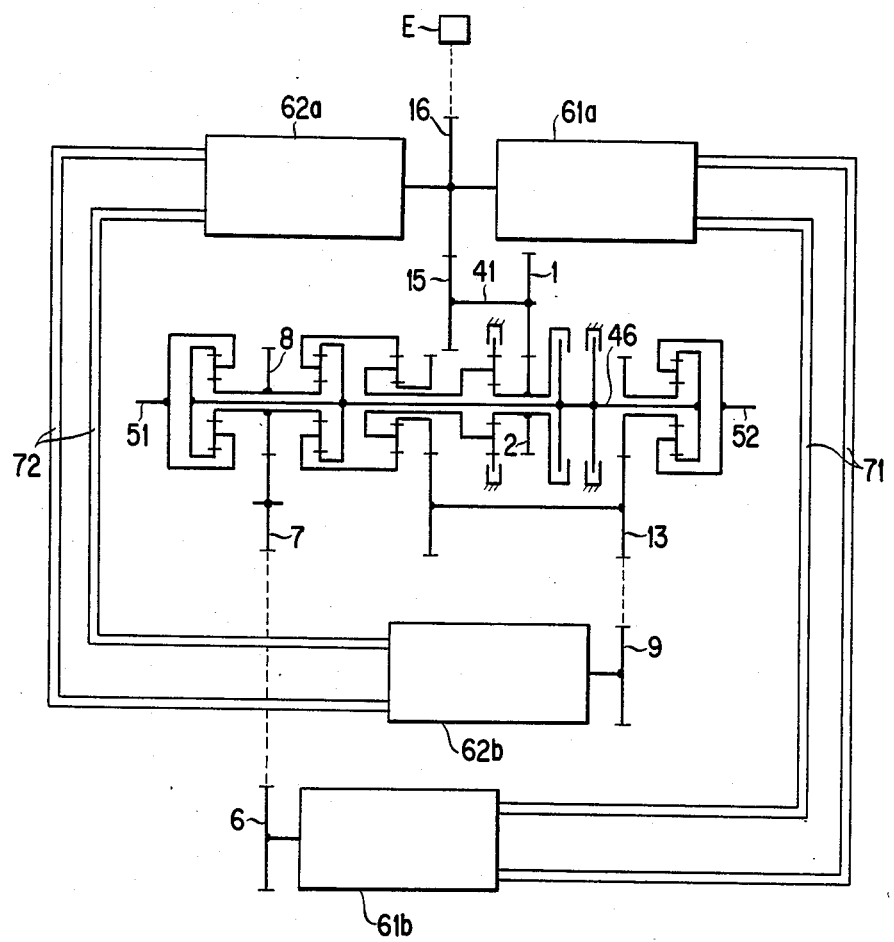
FIG. 3 is a schematic system diagram showing a modification to the first preferred embodiment in FIG. 2.

It is to be noted that while the first and second stepless speed changers 61 and 62, respectively, take integral forms in the embodiment illustrated in FIG. 2, in the case of employing a combination of an oil hydraulic pump and an oil hydraulic motor or a combination of an electric generator and an electric motor for each of the stepless speed changers, in the event that if the integral form is employed the axial length becomes too long and hence the system cannot be assembled in a compact form as a whole, in a modification to the first preferred embodiment, by separately disposing an oil hydraulic pump from an oil hydraulic motor or an electric generator from an electric motor as shown in FIG. 3, the system can be assembled in a compact form, as a whole.

More particularly, with reference to FIG. 3, a gear 15 is mounted on the shaft 41, the gear 15 is meshed with another gear 16, which is mounted on a common input shaft of oil hydraulic pumps (or electric generators) 61a and 62a, power is transmitted from the oil hydraulic pump (or electric generator) 61a to an oil hydraulic motor (or electric motor) 61b through pipings (or electric wirings) 71, and from the oil hydraulic pump (or electric generator) 62a to an oil hydraulic motor (or electric motor) 62b through pipings (or electric wirings) 72, and the seventh and ninth gears 6 and 9 mounted on the output shafts of the oil hydraulic motors 61b and 62b, respectively, are meshed with the eighth and 12th gears 7 and 13.

Figure 4:
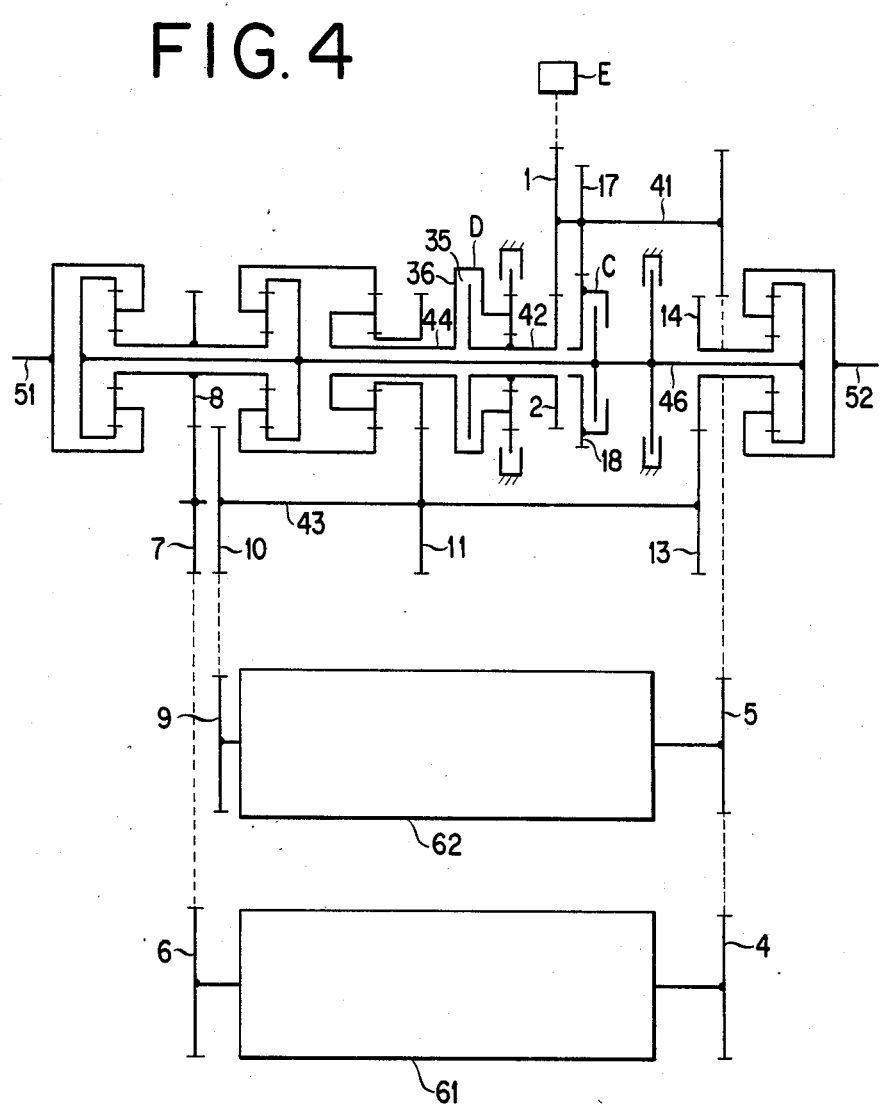
FIG. 4 is a schematic system diagram showing another modification to the first preferred embodiment in FIG. 2.

In another modification to the first preferred embodiment, the speed step for a fourth speed can be additionally provided by disposing gears 17 and 18 having a large speed reduction ratio which are different from the transmission gears used in the speed step for a second speed as the transmission gears for the third clutch C, and by providing a fourth clutch D for directly connecting the shafts 42 and 44 with each other, as shown in FIG. 4. That is, it is only necessary to provide a disc 35 on the shaft 42 and provide a clutch housing 36 on the shaft 44 so that they can be engaged or disengaged by the fourth clutch D.

Now, a second preferred embodiment of the present invention will be described with reference to FIG. 5.

An input gear 101 coupled to an engine E serving as a power source, is mounted on an input shaft 141, on this input shaft 141 are also mounted a first gear 102 and a second gear 104, the input gear 101 meshes with a third gear 110, and the third gear 110 further meshes with a fourth gear 111.

The third gear 110 is mounted on a shaft 147 in a relatively rotatable manner, on this shaft 147 are fixedly mounted fifth to eighth gears 113, 115, 116 and 118, the fourth gear 111 is mounted on a tubular shaft 142, and on the same tubular shaft 142 are mounted a sun gear 131a of a first planetary gear assembly 131 and discs 153 and 154.

The sixth gear 115 meshes with a ninth gear 114, and a third clutch C' is mounted to the ninth gear 114 so as to be able to couple the ninth gear 114 to the disc 153.

The sun gear 131a meshes with planetary gears 131c, which in turn mesh with a ring gear 131b, the ring gear 131b is mounted on a disc 152, and the disc 152 can be fixed by means of a second clutch B'. Furthermore, the planetary gears 131c are rotatably mounted on a carrier 131d, which is in turn connected to a carrier 132d of a second planetary gear assembly 132 via a drum 143, a fourth clutch D' is mounted on the drum 143 so as to be able to couple a disc 154 to the drum 143, planetary gears 132c are rotatably mounted on the carrier 132d and mesh with a sun gear 132a and a ring gear 132b, the sun gear 132a is mounted on the shaft 145, and on the same shaft 145 are also mounted a tenth gear 107 and a sun gear 134a of a fourth planetary gear assembly 134.

The ring gear 132b is mounted to a carrier 133d of a third planetary gear assembly 133 via a drum 144, on the carrier 133d are rotatably mounted planetary gears 133c which mesh with a sun gear 133a and a ring gear 133b, a disc 151 and an 11th gear 112 are mounted on the ring gear 133b, the disc 151 can be fixed by means of a first clutch A', the sun gear 133a is mounted on a shaft 146, and on the shaft 146 are also mounted a 12th gear 109 and a sun gear 135a of the fifth planetary gear assembly 135. The 11th gear 112 meshes with the fifth gear 113, the seventh gear 116 meshes with a 13th gear 117, the eighth gear 118 meshes with a 14th gear 119, and the 13th gear 117 is mounted on a ring gear 134b of the fourth planetary gear assembly 134.

The ring gear 134b meshes with planetary gears 134c, which in turn mesh with the sun gear 134a and are rotatably mounted on a carrier 134d, and the carrier 134d is mounted to a first output shaft 161.

The 14th gear 119 is mounted on a ring gear 135b of the fifth planetary gear assembly 135, the ring gear 135b meshes with planetary gears 135c which in turn mesh with the sun gear 135a and are rotatably mounted on a carrier 135d, and the carrier 135d is mounted to a second output shaft 162.

The first gear 102 meshes with a 15th gear 103, which is mounted on an input shaft of a first stepless speed changer 171. The second gear 104 meshes with a 16th gear 105, which is mounted on an input shaft of a second stepless speed changer 172.

On an output shaft of the first stepless speed changer 171 is mounted a 17th gear 106, which meshes with the tenth gear 107, while on an output shaft of the second stepless speed changer 172 is mounted an 18th gear 108 which meshes with the 12th gear 109.

Each of the first and second stepless speed changers 171 and 172 can change its input-to-output rotational speed ratio [(a rotational speed of the 17th gear 106 or the 18th gear 108)÷(a rotational speed of the 15th gear 103 or the 16th gear 106)] from a negative value to a positive value in a stepless manner. For instance, a stepless speed changer constructed of a combination of a variable swash plate type axial piston pump (hereinafter called simply "oil hydraulic pump") and a fixed (or variable) swash plate type axial piston motor (hereinafter called simply "oil hydraulic motor"), or a combination of an electric generator and an electric motor, has been known.

Now description will be made on the operation of the above-described speed-change/steering system according to the second preferred embodiment of the present invention.

(1) Speed step for a first speed:

The first clutch A' is engaged, and the second, third and fourth clutches B', C' and D' are disengaged.

The power supplied to the input gear 101 is transmitted to the sun gears 134a and 135a of the fourth and fifth planetary gear assemblies 134 and 135 by the intermediary of the first, 15th, second and 16th gears 102, 103, 104 and 105, the first and second stepless speed changers 171 and 172, and the 17th, tenth, eighth and 12th gears 106, 107, 108 and 109.

On the other hand, since the shaft 147 is fixed via the 11th and fifth gears 112 and 113 by the action of the first clutch A', the ring gears 134b and 135b are fixed by the clutch A'.

Accordingly, power is transmitted from the carriers 134d and 135d, respectively, to the first and second output shafts 161 and 162.

Under this condition, by increasing the input-to-output rotational speed ratios of the first and second stepless speed changers 171 and 172 from 0, the rotational speeds of the first and second output shafts 161 and 162 are increased from 0, and also by reversing the output rotations of the first and second stepless changers 171 and 172, the rotations of the first and second output shafts 161 and 162 are also reversed.

By appropriately selecting the numbers of teeth of the respective gears, it is made possible to make the relative rotational speed of the second clutch B' zero (to make the disc 152 stationary) at particular values (>0) of the input-to-output rotational speed ratios of the first an second stepless speed changers 171 and 172 during the operation at the speed step for a first speed. If the second clutch B' is engaged and the first clutch A' is disengaged at this moment, then the operation can be shifted to the speed step for a second speed. At this time, no change occurs in the rotational speeds of the respective component parts.

(2) Speed step for a second speed:

The second clutch B' is engaged, and the first, third and fourth clutches A', C' and D' are disengaged.

After the operation has been shifted to the speed step for a second speed at the particular values of the input-to-output rotational speed ratios of the first and second stepless speed changers 171 and 172, if the input-to-output rotational speed ratios of the first and second speed changers 171 and 172 are decreased, the rotational speeds of the first and second output shafts 161 and 162 would rise. More particularly, a part of the power supplied to the input gear 101 is transmitted to the sun gears 132a, 133a, 134a and 135a of the second to fifth planetary gear assemblies 132, 133, 134 and 135 by the intermediary of the first, 15th, second and 16th gears 102, 103, 104 and 105, the first and second stepless speed changers 171 and 172, and the 17th, tenth, 18th and 12th gears 106, 107, 108 and 109.

On the other hand, since the clutch B' is engaged, the first planetary gear assembly 131 is in an operative condition (a power transmitting condition), and hence another part of the power supplied to the input gear 101 is transmitted to the carrier 132d by the intermediary of the third and fourth gears 110 and 111, the sun gear 131a, the planetary gears 131c, the carrier 131d and the drum 143. In the second planetary gear assembly 132, the power transmitted to the carrier 132d is combined with the power transmitted to the sun gear 132a, and the resultant power is transmitted, via the ring gear 132b and the drum 144, to the carrier 133d. In the third planetary gear assembly 133 also, the power transmitted to the carrier 133d is combined with the power transmitted to the sun gear 133a, and the resultant power is transmitted, via the ring gear 133b and the 11th and fifth gears 112 and 113, to the shaft 147. Then the power transmitted to the shaft 147 is further transmitted through the seventh, 13th, eighth and 14th gears 116, 117, 118 and 119 to the ring gears 134b and 135b of the fourth and fifth planetary gear assemblies 134 and 135 as shared thereby.

Then the power transmitted to the ring gear 134b and the power transmitted to the sun gear 134a are combined and transmitted, via the carrier 134d, to the first output shaft 161, while the power transmitted to the ring gear 135b and the power transmitted to the sun gear 135a are combined and transmitted, via the carrier 135d, to the second output shaft 162.

If the input-to-output rotational speed ratios of the first and second stepless speed changers 171 and 172 are decreased, then the shaft 147 is accelerated by the intermediary of the second and third planetary gear assemblies 132 and 133, and hence the ring gears 134b and 135b are accelerated, but the sun gears 134a and 135a are decelerated. However, provided that the numbers of teeth of the respective gears are appropriately chosen, the rotational speeds of the first and second output shafts 161 and 162 which are determined by combining the rotational speeds of the ring gear 134b and the sun gear 134a and by combining the rotational speeds of the ring gear 135b and the sun gear 135a, respectively, would rise.

As the input-to-output rotational speed ratios of the first and second stepless speed changers 171 and 172 are reduced, they pass through 0 and become negative rotational speed ratios, and when they have reached particular negative values, a relative rotational speed of the third clutch C' becomes 0. Hence, if the third clutch C' is engaged and the second clutch B' is disengaged, then the operation can shift to the speed step for a third speed without any shock. At this time, no change occurs in the rotational speeds of the respective component parts.

(3) Speed step for a third speed:

The third clutch C' is engaged, and the first, second and fourth clutches A', B' and D' are disengaged.

After the operation has been shifted to the speed step for a third step at the particular values of the input-to-output rotational speed ratios of the first and second stepless speed changers 171 and 172, if the input-to-output rotational speed ratios of the first and second stepless speed changers 171 and 172 are increased, the rotational speeds of the output shafts 161 and 162 would rise.

More particularly, a part of the power supplied to the input gear 101 is transmitted to the sun gears 134a and 135a of the fourth and fifth planetary gear assemblies 134 and 135 by the intermediary of the first, 15th, second and 16th gears 102, 103, 104 and 105, the first and second stepless speed changers 171 and 172, and the 17th, tenth, 18th and 12th gears 106, 107, 108 and 109.

On the other hand, since the third clutch C' is engaged, another part of the power supplied to the input gear 101 is transmitted to the shaft 147 via the third and fourth gears 110 and 111, the shaft 142, the disc 153, the clutch C' and the ninth and sixth gears 114 and 115, and the power transmitted to the shaft 147 is further transmitted through the seventh, 13th, eighth and 14th gears 116, 117, 118 and 119 to the ring gears 134b and 135b of the fourth and fifth planetary gear assemblies 134 and 135 as shared thereby. Then, the power transmitted to the ring gear 134b and the power transmitted to the sun gear 134a are combined, and the resultant power is transmitted via the carrier 134d to the first output shaft 161, while the power transmitted to the ring gear 135b and the power transmitted to the sun gear 135a are combined, and the resultant power is transmitted via the carrier 135d to the second output shaft 162.

If the input-to-output rotational speed ratios of the first and second stepless speed changers 171 and 172 are increased, then the sun gears 134a and 135a are accelerated. On the other hand, the ring gears 134b and 135b are rotating at a constant speed, and so, the rotational speeds of the output shafts 161 and 162 would rise.

As the input-to-output rotational speed ratios of the first and second stepless speed changers 171 and 172 are increased, they pass through 0 and become positive rotational speed ratios, and when they have reached particular positive values, a relative rotational speed of the fourth clutch D' becomes 0. Hence, if the fourth clutch D' is engaged and the third clutch C' is disengaged at this moment, then the operation can shift to the speed step for a fourth speed without any shock. At this time, no change occurs in the rotational speeds of the respective component parts.

(4) Speed step for a fourth speed:

The fourth clutch D' is engaged, and the first to third clutches A', B' and C' are disengaged.

After the operation has been shifted to the speed step for a fourth speed at the particular values of the input-to-output rotational speed ratios of the first and second stepless speed changers 171 and 172, if the input-to-output rotational speed ratios of the first and second speed changers 171 and 172 are decreased, then the rotational speeds of the first and second output shafts 161 and 162 would rise.

Here, it is to be noted that the difference between the speed step for a second speed and the speed step for a fourth speed resides only in the speed reduction ratio of the transmission system from the input gear 101 to the carrier 132d, such that the speed reduction ratio is large due to the first planetary gear assembly 131 in the speed step for a second step, while the speed reduction ratio is small due to the fourth clutch D' in the speed step for a fourth speed. The other operations in the speed step for a fourth speed are identical to those in the speed step for a second speed, and therefore, further description thereof will be omitted.

(5) Steering:

By giving a difference between the input-to-output ratios of the first and second stepless speed changers 171 and 172, a difference is produced between the rotational speeds of the first and second output shafts 161 and 162, so that the vehicle can turn.

More particularly, under any condition among the above-described speed steps for the first, second, third and fourth speeds, the ring gears 134b and 135b of the fourth and fifth planetary gear assemblies 134 and 135 are kept at the same rotational speed by the intermediary of the shaft 147. Accordingly, the difference between the rotational speeds of the first and second output shafts 161 and 162 during running, is determined by the difference in rotational speeds between the sun gears 134a and 135a. Hence, by variably giving a difference between the input-to-output rotational speed ratios of the first and second stepless speed changers 171 and 172, the rotational speed difference between the first and second output shafts 161 and 162, that is, the radius of turning movement can be changed in a stepless manner.

Since the speed-change/steering system according to the second preferred embodiment is constructed and operates as described above, it can smoothly change in speed and steer a vehicle.

In addition, owing to the fact that the respective planetary gear assemblies 131 to 135 and the respective clutches A' to D' are disposed along the same axis, the entire system can be constructed in a compact form.

Figure 5:
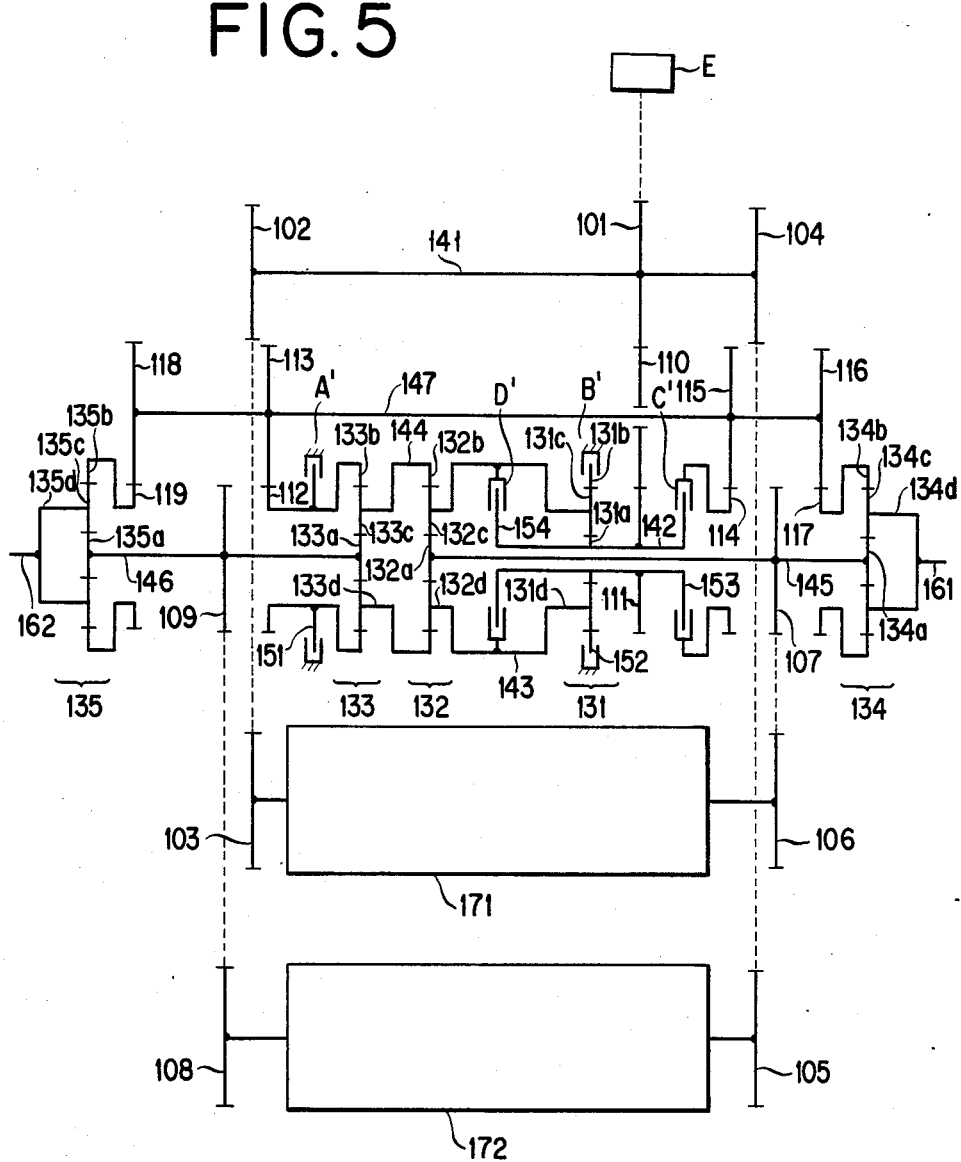
FIG. 5 is a schematic system diagram showing a second preferred embodiment of the present invention.
Figure 6:
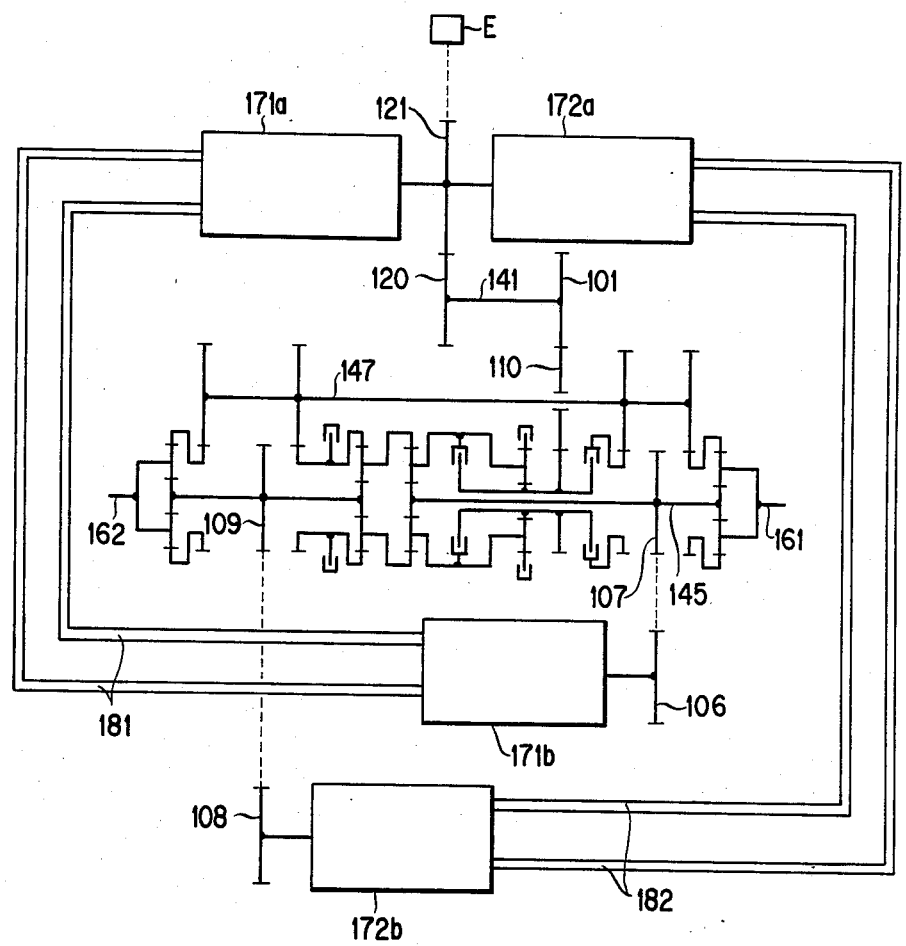
FIG. 6 is a schematic system diagram showing a modification to the second preferred embodiment of the present invention.

It is to be noted that while the first and second stepless speed changers 171 and 172, respectively, take integral forms in the embodiment illustrated in FIG. 5, in the case of employing a combination of an oil hydraulic pump and an oil hydraulic motor or a combination of an electric generator and an electric motor, in the event that if the integral form is employed the axial length becomes too long and hence the system cannot be assembled in a compact form as a whole, in a modification to the second preferred embodiment, by separately disposing an oil hydraulic pump from an oil hydraulic motor or an electric generator from an electric motor as shown in FIG. 6, the system can be assembled in a compact form, as a whole.

More particularly, with reference to FIG. 6, a gear 120 is mounted on the shaft 141, the gear 120 is meshed with another gear 121, which is mounted on a common input shaft of oil hydraulic pumps (or electric generators) 171a and 172a, power is transmitted from the oil hydraulic pump (or electric generator) 171a to an oil hydraulic motor (or electric motor) 171b through pipings (or electric wirings) 181, and from the oil hydraulic pump (or electric generator) 172a to an oil hydraulic motor (or electric motor) 172b through pipings (or electric wirings) 182.

While the speed steps for first to fourth speeds are provided in the embodiments shown in FIGS. 5 and 6, the illustrated system can be changed to provide the speed steps for first to third speeds by omitting the fourth clutch D', and further, it is also possible to provide only the speed steps for first and second speeds by omitting the third clutch C'.

According to the present invention, a speed-change/steering system for crawler type vehicles is constructed as described above, hence the system can smoothly change a speed of the vehicle or steer the vehicle, and moreover, the entire system can be assembled in a compact form.

What is claimed is:

1. A speed-change and steering system for a crawler type vehicle comprising:
first and second stepless speed changers each having an input and output and each of which can change its input-to-output rotational speed ratio in stepless manner;
means for coupling said first and second stepless speed changer inputs to a power source;
first, second, third, fourth and fifth planetary gear assemblies disposed on a main shaft;
a first output shaft connected to a first element of said fourth planetary gear assembly and a second output shaft connected to a similar first element of said fifth planetary gear assembly;
means for connecting said output of said first stepless speed changer to a second element of said fourth planetary gear assembly and to a first element of said third planetary gear assembly;
means for connecting said output of said second stepless speed changer to a second element of said fifth planetary gear assembly and to a first element of said second planetary gear assembly;
means for connecting a second element of said second planetary gear assembly to a second element of said third planetary gear assembly;
means for coupling said first planetary gear assembly to said power source;
a first braking means disposed on said main shaft for fixing said main shaft;
a second braking means for fixing one element of said first planetary gear assembly;
a third clutch means for securing said power source to said main shaft;
means for connecting a second element of said first planetary gear assembly to a third element of said second planetary gear assembly;
means for connecting said first element of said third planetary gear assembly to said second element of said fourth planetary gear assembly; and
means for fixing a third element of said third planetary gear assembly, a third element of said fourth planetary gear assembly and a third element of said fifth planetary gear assembly to said main shaft;
said connecting means, clutch means and fixing means operating through said foruth and fifith planetary gear assemblies to provide a plurality of speed steps for said first and second output shafts, the rotational speed of said first and second output shafts being controlled individually in each speed step in accordance with said input-to-output rotational speed ratio of said first and second stepless speed changers, respectively.

2. A speed-change and steering for a crawler type vehicle comprising:
first and second stepless speed changers each having an input and output and each of which can change its input-to-ouput rotational speed ratio in a stepless manner;
means for coupling said first and second stepless speed changer inputs to a power source;
first, second, third, fourth and fifth planetary gear assemblies disposed on a main shaft;
a first output shaft connected to a first element of said fourth planetary gear assembly and a second output shaft connected to a similar first element of said fifth planetary gear assembly;
a first shaft connecting a first element of said second planetary gear assembly to a second element of said fourth planetary gear assembly;
means for coupling said first shaft to said output of said first stepless speed changer;
a second shaft connecting a first element of said third planetary gear assembly to a second element of said fifth planetary gear assembly;
means for coupling said second shaft to said output of said second stepless speed changer;
means for connecting said power source to said first planetary gear assembly;

means for connecting a first element of said first planetary gear assembly to a second element of said second planetary gear assembly;

means for coupling a third element of said second planetary gear assembly to a second element of said third planetary gear assembly;

a third shaft disposed in parallel to said first, second, third, fourth and fifth planetary gear assemblies;

means for connecting said third shaft to respective third elements of said third, fourth and fifth planetary gear assemblies;

a first braking means fixing said third shaft;

a second braking clutch means for fixing a second element of said first planetary gear assembly;

a third clutch means for securing power source to said third shaft; and a fourth clutch means for securing said connecting means between said first element of said first planetary gear assembly and said second element of said second planetary gear assembly;

whereby rotational speeds of said first and second output shafts are controlled equally by said first, second and third planetary gear assemblies and operation of said clutch means through said fourth and fifth planetary gear assemblies, and are controlled individually by changes in said input-to-output rotational speed ratios of said first and second stepless speed changers, respectively.

* * * * *